(12) United States Patent
Shi et al.

(10) Patent No.: US 12,379,623 B2
(45) Date of Patent: Aug. 5, 2025

(54) COLOR FILM SUBSTRATE AND METHOD FOR PREPARING COLOR FILM SUBSTRATE, LIQUID CRYSTAL DISPLAY PANEL

(71) Applicants: Ordos Yuansheng Optoelectronics Co., Ltd., Inner Mongolia (CN); BOE TECHNOLOGY GROUP CO., LTD., Beijing (CN)

(72) Inventors: Zhen Shi, Beijing (CN); Jianyun Xie, Beijing (CN); Yezhou Fang, Beijing (CN); Fengguo Wang, Beijing (CN); Yongsheng Li, Beijing (CN); Bo Wang, Beijing (CN); Guojiang Yu, Beijing (CN); Shilong Zhang, Beijing (CN); Wei Miao, Beijing (CN); Lei Gao, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/558,208

(22) PCT Filed: Nov. 9, 2022

(86) PCT No.: PCT/CN2022/130807
§ 371 (c)(1),
(2) Date: Oct. 31, 2023

(87) PCT Pub. No.: WO2024/098274
PCT Pub. Date: May 16, 2024

(65) Prior Publication Data
US 2025/0085587 A1    Mar. 13, 2025

(51) Int. Cl.
*G02F 1/1335* (2006.01)

(52) U.S. Cl.
CPC .. *G02F 1/133516* (2013.01); *G02F 1/133512* (2013.01)

(58) Field of Classification Search
CPC ......... G02F 1/133516; G02F 1/133512; G02F 1/13394
See application file for complete search history.

(56) References Cited

U.S. PATENT DOCUMENTS

2016/0209701 A1*   7/2016   Qin ..................... G02B 5/201
2021/0088835 A1    3/2021   Wen
(Continued)

FOREIGN PATENT DOCUMENTS

| CN | 203299492 U | 11/2013 |
| CN | 104460105 A | 3/2015 |

(Continued)

OTHER PUBLICATIONS

Written Opinion from PCT/CN2022/130807 dated May 28, 2023.
International Search Report from PCT/CN2022/130807 dated May 28, 2023.

*Primary Examiner* — Joseph L Williams
(74) *Attorney, Agent, or Firm* — Calfee, Halter & Griswold LLP

(57) ABSTRACT

A color film substrate includes a base substrate, a black matrix layer, a color-resist layer, a protective layer, and a supporting post layer that are stacked and provided in sequence; the black matrix layer is provided with light-transmitting windows distributed in an array, and the color-resist layer covers each light-transmitting window; the supporting post layer is provided with a supporting post; the color film substrate includes a plurality of different subregions; in at least part of the subregions, the color-resist layer is provided with a partition slot located between rows of (Continued)

light-transmitting windows and exposing the black matrix layer, and an orthographic projection of the supporting post on the base substrate at least partially overlaps with an orthographic projection of the partition slot on the base substrate; in at least two of the subregions, the partition slot is provided with different widths.

20 Claims, 7 Drawing Sheets

(56) References Cited

U.S. PATENT DOCUMENTS

2022/0050325 A1    2/2022  Liu
2025/0085577 A1*   3/2025  Zhou ..................... H10D 86/60

FOREIGN PATENT DOCUMENTS

| CN | 104656318 A  | 5/2015  |
|----|--------------|---------|
| CN | 104698739 A  | 6/2015  |
| CN | 105204238 A  | 12/2015 |
| CN | 205374936 U  | 7/2016  |
| CN | 103995388 B  | 8/2016  |
| CN | 106569361 A  | 4/2017  |
| CN | 105204238 B  | 2/2019  |
| CN | 110262117 A  | 9/2019  |
| CN | 110488529 A  | 11/2019 |
| CN | 111427198 A  | 7/2020  |
| JP | 2004212743 A | 7/2004  |
| WO | 2021174462 A1| 9/2021  |

* cited by examiner

| 5%  | 10% | 15% | 20%  |
|-----|-----|-----|------|
| 25% | 30% | 35% | 40%  |
| 45% | 50% | 55% | 60%  |
| 65% | 70% | 75% | 80%  |
| 85% | 90% | 95% | 100% |

FIG. 11

| 3.14 | 3.14 | 3.16 | 3.15 | 3.18 | 3.15 | 3.14 | 3.16 | 3.16 | 3.16 | 3.15 | 3.14 |
|------|------|------|------|------|------|------|------|------|------|------|------|
| 3.07 | 3.09 | 3.09 | 3.11 | 3.11 | 3.09 | 3.07 | 3.07 | 3.08 | 3.08 | 3.09 | 3.06 |
| 3.05 | 3.05 | 3.06 | 3.07 | 3.07 | 3.05 | 3.04 | 3.03 | 3.06 | 3.07 | 3.06 | 3.03 |
| 3.06 | 3.07 | 3.06 | 3.08 | 3.07 | 3.06 | 3.05 | 3.08 | 3.06 | 3.08 | 3.07 | 3.05 |
| 3.07 | 3.09 | 3.08 | 3.11 | 3.1  | 3.09 | 3.06 | 3.06 | 3.08 | 3.1  | 3.09 | 3.07 |
| 3.09 | 3.16 | 3.13 | 3.17 | 3.16 | 3.12 | 3.08 | 3.08 | 3.1  | 3.12 | 3.12 | 3.1  |
| 3.1  | 3.13 | 3.12 | 3.16 | 3.14 | 3.11 | 3.1  | 3.1  | 3.1  | 3.11 | 3.12 | 3.1  |
| 3.07 | 3.07 | 3.07 | 3.08 | 3.08 | 3.07 | 3.05 | 3.09 | 3.06 | 3.07 | 3.08 | 3.04 |
| 3.03 | 3.04 | 3.05 | 3.06 | 3.05 | 3.04 | 3.01 | 3.04 | 3.02 | 3.03 | 3.04 | 3.02 |
| 3.03 | 3.05 | 3.05 | 3.06 | 3.05 | 3.04 | 3.01 | 3.02 | 3.02 | 3.02 | 3.03 | 3.02 |
| 3.05 | 3.08 | 3.08 | 3.09 | 3.09 | 3.05 | 3.04 | 3.06 | 3.06 | 3.05 | 3.06 | 3.05 |
| 3.11 | 3.14 | 3.15 | 3.18 | 3.14 | 3.15 | 3.1  | 3.13 | 3.11 | 3.13 | 3.16 | 3.13 |

COLOR FILM SUBSTRATE AND METHOD FOR PREPARING COLOR FILM SUBSTRATE, LIQUID CRYSTAL DISPLAY PANEL

CROSS REFERENCE

The present disclosure is based upon International Application No. PCT/CN2022/130807, filed on Nov. 9, 2022, the entire contents of which are incorporated herein by reference.

TECHNICAL FIELD

The present disclosure relates to the field of display technology, in particular, to a color film substrate, a method for preparing a color film substrate, and a liquid crystal display panel.

BACKGROUND

In liquid crystal display (LCD) products, the supporting post play a role in supporting the liquid crystal cell, and the height uniformity of the supporting post plays an important role in the thickness uniformity of the liquid crystal cell. However, when preparing the supporting post, due to the fact that there are performance differences of the supporting post preparation equipment (such as supporting post material coating equipment and supporting post exposure equipment) at different positions, the height uniformity of the supporting post of the liquid crystal product needs to be further improved.

It should be noted that the information disclosed in the above background part is only for enhancing the understanding of the background of the present disclosure, and therefore may include information that does not constitute the related art known to those of ordinary skill in the art.

SUMMARY

The objective of the present disclosure is to overcome the above-mentioned shortcomings of the related art, and provide a color film substrate and a method for preparing the color film substrate, and a liquid crystal display panel, improving the uniformity of the supporting post height.

According to a first aspect of the present disclosure, there is provided a color film substrate, including a base substrate, a black matrix layer, a color-resist layer, a protective layer, and a supporting post layer that are stacked and provided in sequence; wherein, the black matrix layer is provided with light-transmitting windows distributed in an array, the color-resist layer covers each light-transmitting window, and the supporting post layer is provided with a supporting post;
  the color film substrate includes a plurality of different subregions;
  in at least part of the subregions, the color-resist layer is provided with a partition slot located between rows of the light-transmitting windows and exposing the black matrix layer, and an orthographic projection of the supporting post on the base substrate at least partially overlaps with an orthographic projection of the partition slot on the base substrate;
  where, in at least two of the subregions, the partition slot is provided with different widths, and a width of the partition slot is a size of the partition slot in a column direction According to an embodiment of the present disclosure, along the column direction, a size between two adjacent light-transmitting windows is a sub-pixel pitch; and, a ratio of the width of the partition slot to the sub-pixel pitch is no more than 90%.

According to some embodiments of the present disclosure, along the column direction, a size between two adjacent light-transmitting windows is a sub-pixel pitch; and, a ratio of the width of the partition slot to the sub-pixel pitch is greater than 10%.

According to some embodiments of the present disclosure, a difference between an average value of a height of each supporting post in any one of the subregions and an average value of a height of each supporting post in another one of the subregions is no more than 0.12 microns;
  the height of the supporting post refers to a segment difference between a top end surface of the supporting post and a surface of the protective layer away from the base substrate According to some embodiments of the present disclosure, in at least part of the subregions, a surface of the protective layer away from the base substrate is provided with a recessed region overlapping with the partition slot, and an orthographic projection of the supporting post on the protective layer is located in the recessed region.

According to some embodiments of the present disclosure, in any one of the subregions, a number of the supporting post is one or more.

According to some embodiments of the present disclosure, in two subregions where widths of the partition slot are different, a top-to-bottom segment difference of the supporting post is larger in a subregion where the width of the partition slot is larger;
  the top-to-bottom segment difference of the supporting post refers to a segment difference between a top end surface of the supporting post and a bottom end surface of the supporting post.

According to a second aspect of the present disclosure, there is provided a liquid crystal display panel, including the above-mentioned color film substrate, and a driving substrate provided in a box opposite to the color film substrate.

According to a third aspect of the present disclosure, there is provided a method for preparing a color film substrate, the color film substrate including a base substrate, a black matrix layer, a color-resist layer, a protective layer, and a supporting post layer that are stacked and provided in sequence; where, the black matrix layer is provided with light-transmitting windows distributed in an array, the color-resist layer covers each light-transmitting window, and the supporting post layer is provided with a supporting post;
  the color film substrate includes a plurality of different subregions; in at least part of the subregions, the color-resist layer is provided with a partition slot located between rows of the light-transmitting windows and exposing the black matrix layer, and an orthographic projection of the supporting post on the base substrate at least partially overlaps with an orthographic projection of the partition slot on the base substrate;
  the method for preparing the color film substrate includes:
  preparing a test color film substrate;
  obtaining an average value of a supporting post height of at least one subregion of the test color film substrate;
  obtaining correction relationship information, the correction relationship information including a mapping relationship between a relevant parameter of a partition slot width and a relevant parameter of the supporting post height;

determining a target value of the relevant parameter of the partition slot width of the subregion according to the relevant parameter of the partition slot width and the average value of the supporting post height of the at least one subregion of the test color film substrate, a target value of the supporting post height, and the correction relationship information; and preparing a target color film substrate according to a target value of the relevant parameter of the partition slot width of each subregion.

According to some embodiments of the present disclosure, determining a target value of the relevant parameter of the partition slot width of the subregion according to the relevant parameter of the partition slot width of the at least one subregion of the test color film substrate, the average value of the supporting post height, a target value of the supporting post height, and the correction relationship information includes:

determining, according to an average value of the supporting post height of a subregion of the test color film substrate and a target value of the supporting post height of the subregion, a compensation parameter of the supporting post height of the subregion;

determining, according to a relevant parameter of the partition slot width of the subregion of the test color film substrate and the correction relationship information, a relevant parameter of the supporting post height corresponding to the relevant parameter of the partition slot width of the subregion, and taking the determined relevant parameter of the supporting post height as a basic parameter of the supporting post height of the subregion;

determining, according to the basic parameter of the supporting post height of the subregion and the compensation parameter of the supporting post height of the subregion, a correction parameter of the supporting post height of the subregion; and determining, according to the correction parameter of the supporting post height of the subregion and the correction relationship information, a relevant parameter of the partition slot width corresponding to the correction parameter of the supporting post height, and taking the determined relevant parameter of the partition slot width as the target value of the relevant parameter of the partition slot width of the subregion.

According to some embodiments of the present disclosure, the correction relationship information includes a plurality of discrete correction samples, and any one of the correction samples includes the relevant parameter of the partition slot width and the relevant parameter of the supporting post height corresponding to each other;

determining, according to the relevant parameter of the partition slot width of the subregion of the test color film substrate and the correction relationship information, a relevant parameter of the supporting post height corresponding to the relevant parameter of the partition slot width of the subregion includes:

determining, according to the relevant parameter of the partition slot width of the subregion of the test color film substrate and each of the correction samples, the relevant parameter of the supporting post height corresponding to the relevant parameter of the partition slot width of the subregion by using a linear difference algorithm; and determining, according to the correction parameter of the supporting post height of the subregion and the correction relationship information, a relevant parameter of the partition slot width corresponding to the correction parameter of the supporting post height includes:

determining, according to the correction parameter of the supporting post height of the subregion and each of the correction samples, the relevant parameter of the partition slot width corresponding to the correction parameter of the supporting post height by using a linear difference algorithm.

According to some embodiments of the present disclosure, the relevant parameter of the partition slot width is a partition slot width or a partition slot duty ratio; the partition slot width is a size of the partition slot in a column direction; the partition slot duty ratio is a ratio of the partition slot width to a sub-pixel pitch; and, the sub-pixel pitch is a size between two adjacent light-transmitting windows along the column direction; and the relevant parameter of the supporting post height is a supporting post height or a supporting post height difference; the supporting post height is a segment difference between a top end of the supporting post and a surface of the protective layer away from the base substrate; and, the supporting post height difference is a difference between the supporting post height and a set height.

According to some embodiments of the present disclosure, in each of the subregions of the test color film substrate, the partition slot width is the same; and, the partition slot width is a size of the partition slot in a column direction.

According to some embodiments of the present disclosure, in the test color film substrate, the partition slot duty ratio is in a range of 0-15%.

According to some embodiments of the present disclosure, the correction relationship information further includes an applicable range, and the applicable range includes a thickness range of the protective layer;

obtaining correction relationship information includes:
obtaining the correction relationship information so that a thickness of the protective layer of the color film substrate satisfies the applicable range of the correction relationship information.

According to some embodiments of the present disclosure, the correction relationship information further includes an applicable range, and the applicable range includes a supporting post height range under a set relevant parameter of the partition slot width;

obtaining correction relationship information includes:
obtaining the correction relationship information so that the average value of the supporting post height of the color film substrate satisfies the supporting post height range in the applicable range.

According to some embodiments of the present disclosure, coating equipment and exposure equipment used in preparing the supporting post layer of the test color film substrate are same as coating equipment and exposure equipment used in preparing the supporting post layer of the target color film substrate.

It is to be understood that both the foregoing general description and the following detailed description are exemplary and explanatory only and do not limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts.

FIG. 11 is a schematic diagram of the distribution of the partition slot duty ratio in a subregion of the mapping color film substrate according to some embodiments of the present disclosure.

FIG. 12 is a color scale diagram of the supporting post height of a test color film substrate according to some embodiments of the present disclosure.

FIG. 13 is a color scale diagram of the supporting post height of a target color film substrate according to some embodiments of the present disclosure.

DETAILED DESCRIPTION

Figure 1:
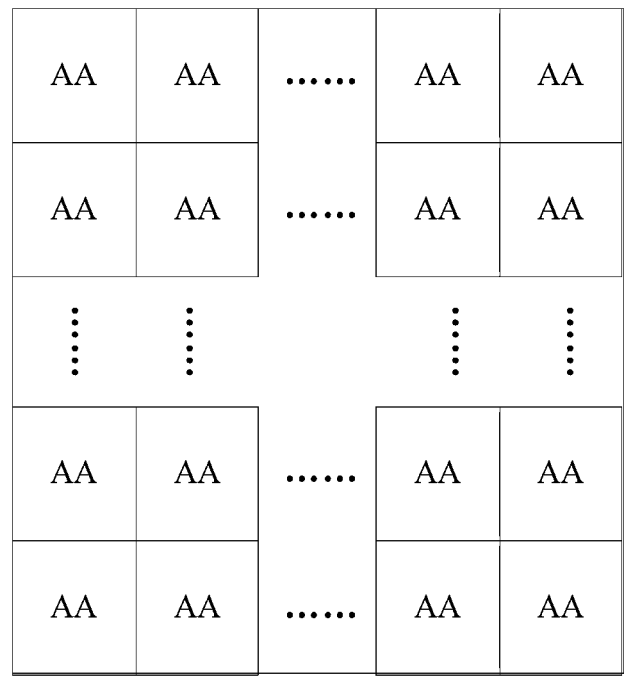
FIG. 1 is a schematic planar structure diagram of a color film substrate according to some embodiments of the present disclosure.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

Although relative terms such as "upper" and "lower" are used in the description to describe the relative relationship of one component to another component shown in the drawings, these terms are used in the description only for convenience, for example, according to the directions shown in the accompanying drawings. It will be appreciated that if the device shown in the drawings is turned over so that it is upside down, then the component described as being "upper" will become the component that is "lower". When a structure is "on" another structure, it may mean that a structure is integrally formed on another structure, or that a structure is "directly" placed on another structure, or that a structure is "indirectly" placed on another structure through another structure.

The terms "a", "an", "the", "said" and "at least one" are used to indicate the presence of one or more elements/components/etc.; the terms "comprising" and "including" are used to indicate an open inclusion and means that there may be additional elements/components/etc. in addition to the listed elements/components/etc.; the terms "first", "second" and "third" etc. are only used as a marker, not a limit on the number of its objects.

Embodiments of the present disclosure provide a liquid crystal display panel, which includes a driving substrate and a color film substrate provided in a box opposite to each other; a liquid crystal cell is formed between the driving substrate and the color film substrate through a frame sealant, and the liquid crystal cell is filled with liquid crystals. Embodiments of the present disclosure further provide a color film substrate of the liquid crystal display panel and a method of preparing the color film substrate, so as to improve the height uniformity of the supporting post PS on the color film substrate, thus improving the uniformity of the liquid crystal cell and improving the performance of the display panel.

Referring to FIG. 1, from a planar perspective, the color film substrate provided by the embodiments of the present disclosure includes a plurality of subregions AA, and one or more supporting posts are provided in each subregion AA. For example, the color film substrate includes a plurality of subregions AA distributed in an array, and the subregions AA may be rectangular and spliced with each other. In this way, any supporting post on the color film substrate is located in one of the subregions AA.

Figure 2:
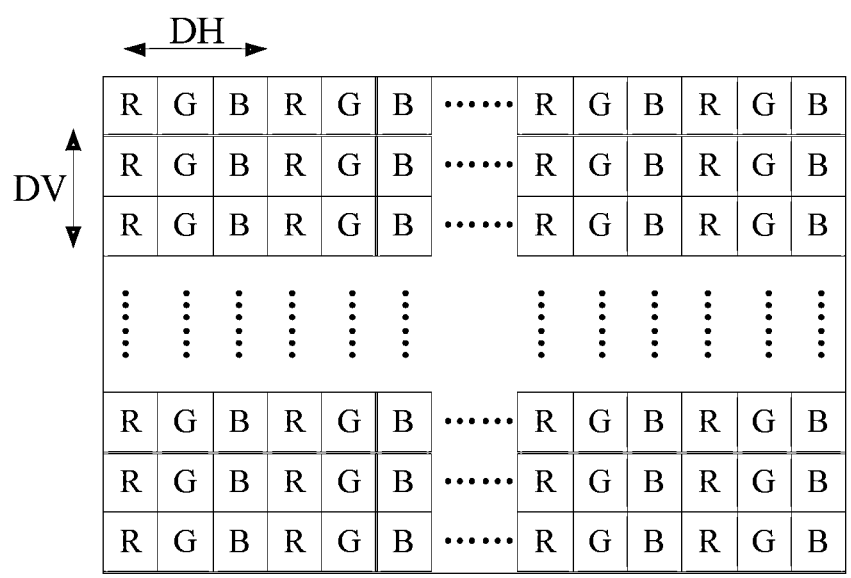
FIG. 2 is a schematic planar structure diagram of a color film substrate according to some embodiments of the present disclosure.
Figure 3:
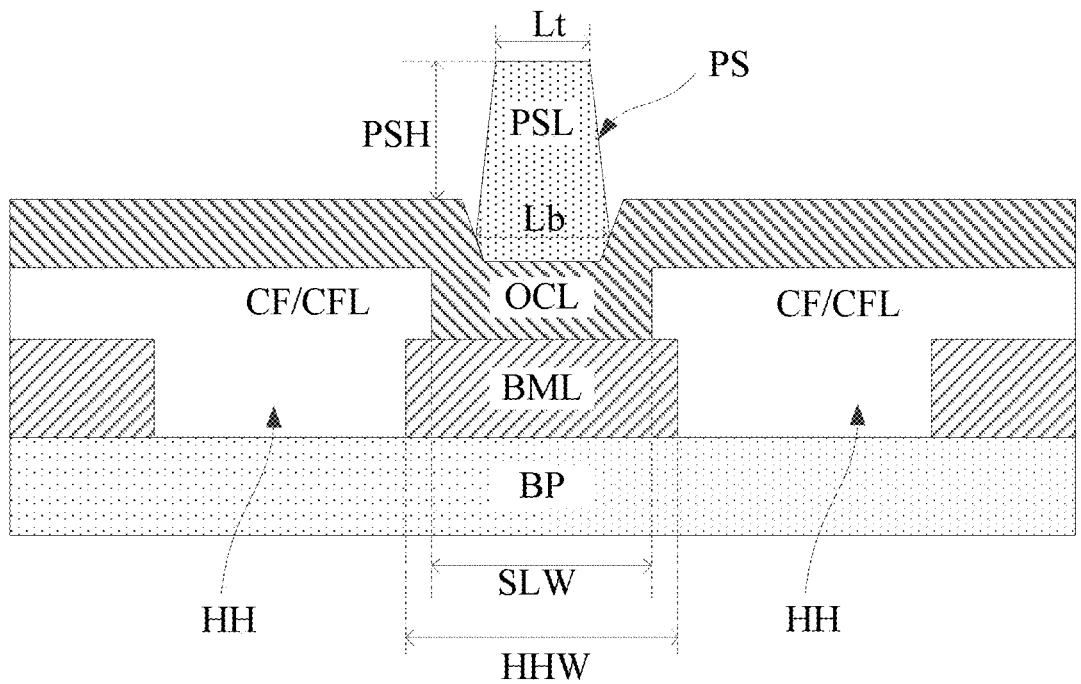
FIG. 3 is a schematic cross-sectional structure diagram of a color film substrate along a row direction according to some embodiments of the present disclosure.

Referring to FIG. 2 and FIG. 3, the color film substrate may include a base substrate BP, a black matrix layer BML, a color-resist layer CFL, a protective layer OCL, and a supporting post layer PSL, which are stacked and provided in sequence. The black matrix layer BML is provided with light-transmitting windows HH distributed in an array, and the color-resist layer CFL covers each of the light-transmitting windows HH. In this way, in the liquid crystal display panel PNL, the light can be emitted from the light-transmitting windows HH through the color-resist layer CFL, thereby achieving display. When the light passes through the color-resist layer CFL, it can be filtered by the color-resist layer CFL.

In some embodiments, the color-resist layer CFL may be provided with a plurality of color-resist units CF of different colors, for example, red color-resist units, green color-resist units and blue color-resist units may be provided. When a light-transmitting window HH is filled with a red color-resist unit, the light emitted from the light-transmitting window HH is red light, and the light-transmitting window HH is marked as a red light-transmitting window R. When a light-transmitting window HH is filled with a green color-resist unit, the light emitted from the light-transmitting window HH is green light, and the light-transmitting window HH is marked as a green light-transmitting window G. When a light-transmitting window HH is filled with a blue color-resist unit, the light emitted from the light-transmitting window HH is blue light, and the light-transmitting window HH is marked as a blue light-transmitting window B. It can be understood that in other embodiments of the present disclosure, the color-resist layer CFL may also include color-resist units CF of other colors, for example, may include colorless and transparent color-resist units CF, so that the light transmitted from the color-resist unit CF is basically white light.

FIG. 2 illustrates an arrangement of light-transmitting windows HH of each color according to some embodiments of the present disclosure. Referring to the example in FIG. 2, along the row direction DH, the red light-transmitting windows R, the green light-transmitting windows G, and the blue light-transmitting windows B are periodically arranged in sequence; along the column direction DV, the light-transmitting windows HH in the same column are light-transmitting windows HH of the same color. In this way, in the liquid crystal display panel PNL using the color film substrate, the sub-pixels adopt a Real RGB arrangement. When this arrangement is adopted, color-resist strips can be used to fill each light-transmitting window HH. For example, a column of red light-transmitting windows R may correspond to a red color-resist strip extending along the column direction DV, and the red color-resist strip may cover each light-transmitting window HH in the column of red light-transmitting windows R and the gap between each light-transmitting window HH.

In the example embodiments of the present disclosure, the structure, principle and effect of the color film substrate in the embodiments of the present disclosure are exemplarily introduced and described by taking that the Real RGB sub-pixel arrangement is adopted in the liquid crystal display panel PNL. In other embodiments of the present disclosure, the liquid crystal display panel PNL may not adopt the Real RGB sub-pixel arrangement, for example, sub-pixels in different rows may be arranged in a wrong order. In this way, two adjacent light-transmitting windows HH along the column direction DV can be respectively filled with color-resist units CF of different colors.

Figure 5:
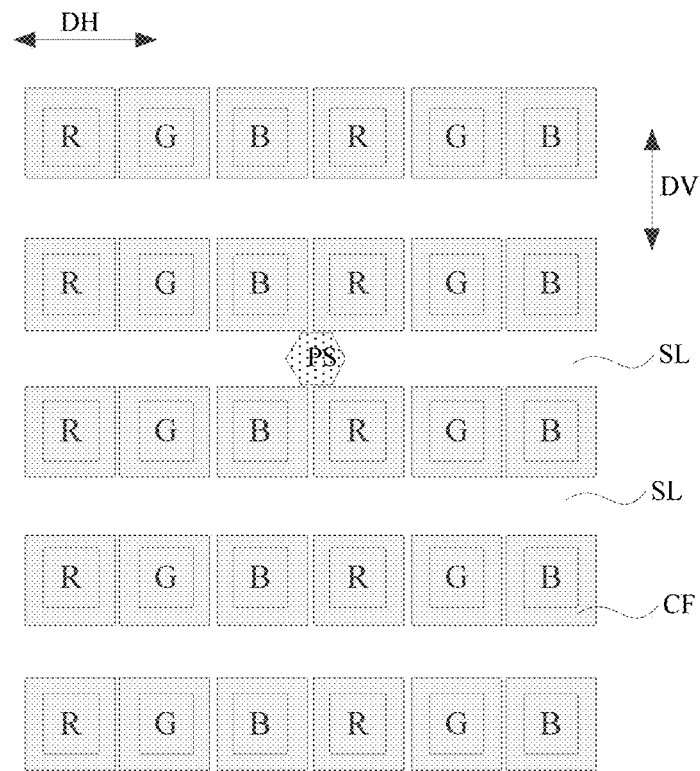
FIG. 5 is a schematic structural diagram of a color-resist layer and a supporting post in a subregion according to some embodiments of the present disclosure.

Referring to FIG. 3 and FIG. 5, in the color film substrate according to the embodiments of the present disclosure, in at least one subregion AA, the color-resist layer CFL is provided with partition slots SL located between rows of light-transmitting windows HH and exposing the black matrix layer BML. In the subregion AA provided with the partition slots SL, an orthographic projection of a supporting post PS on the base substrate BP at least partially overlaps with an orthographic projection of a partition slot SL on the base substrate BP.

Figure 4:
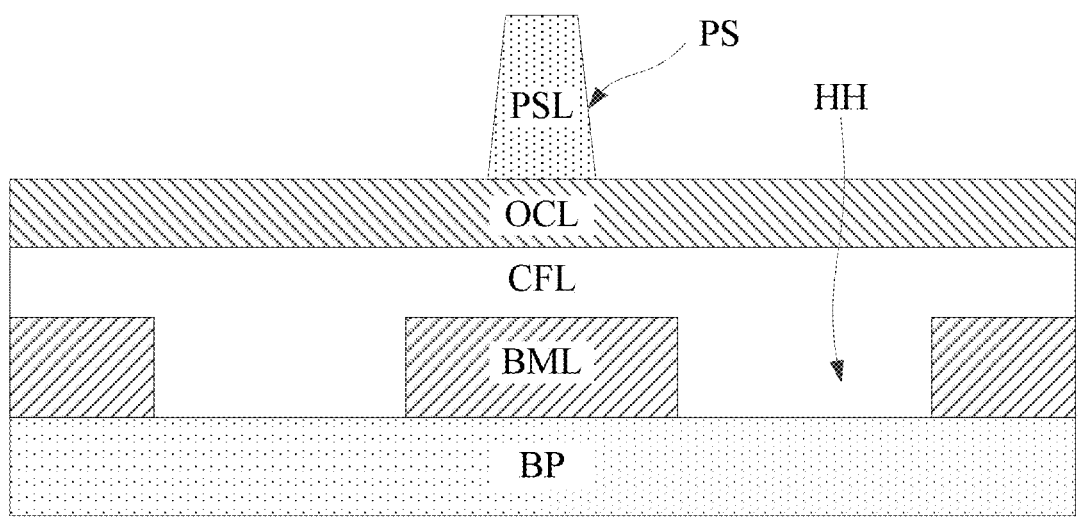
FIG. 4 is a schematic cross-sectional structure diagram of a color film substrate along a column direction in the related art.

Referring to FIG. 4, in the related art, the color-resist layer CFL completely covers the space between the light-transmitting windows HH along the column direction DV, so the color-resist layer CFL can play a role of raising the supporting post PS. When the local height of the supporting post PS is too high, it is often needed to improve the shape or preparation process of the supporting post PS to reduce the top-to-bottom segment difference of the supporting post PS itself, thus reducing the height of the supporting post PS. However, these ways of reducing the height of the supporting post PS may introduce a new mask process, or reduce the production capacity of the color film substrate, which is not conducive to reducing the cost of the color film substrate. In the embodiments of the present disclosure, in the subregion AA where the height of the supporting post PS is too high, the color-resist layer CFL may be provided with a partition slot SL; the supporting post PS at least partially overlaps with the partition slot SL, so that the supporting post PS may sink to reduce the height of the supporting post PS. In this way, it is only needed to change the pattern of the color-resist layer CFL to adjust the height of the supporting post PS, improving the uniformity of the supporting post height PSH on the color film substrate, without introducing additional preparing process or adopting a process that may reduce the production capacity, with lower cost and higher production capacity.

In the embodiments of the present disclosure, the top-to-bottom segment difference of the supporting post PS refers to the segment difference between the top end surface of the supporting post PS (the surface farthest away from the base substrate BP) and the bottom end surface of the supporting post PS (the end surface closest to the base substrate BP); the segment difference is the size of the material forming the supporting post PS in the normal direction of the color film substrate.

In the embodiments of the present disclosure, the supporting post height PSH is the segment difference between the top end surface of the supporting post PS (the surface farthest away from the base substrate BP) and the surface of the protective layer OCL (the surface of the protective layer OCL away from the base substrate BP). Furthermore, the supporting post height PSH is the segment difference between the surface of the protective layer OCL above the center of the blue light-transmitting window B adjacent to the supporting post PS and the top end surface of the supporting post PS.

In an embodiment of the present disclosure, in the plurality of subregions AA of the color film substrate, the color-resist layer CFL is provided with partition slots SL. In this way, the color film substrate can adjust the supporting post height PSH in the plurality of subregions AA where the supporting post height PSH is needed to be adjusted through setting the partition slot SL, so as to improve the uniformity of the supporting post height PSH.

In an embodiment of the present disclosure, in at least two different subregions AA, the partition slot width SLW is different. In the embodiments of the present disclosure, the width of the partition slot SL is the size of the partition slot SL in the column direction DV. In the verification, it was found that the height reduction degree of the supporting post PS overlapping with the partition slot SL is different for different partition slots SL. Specifically, the greater the partition slot SL, the greater the height reduction degree of the supporting post PS overlapping with the partition slot SL. Therefore, when preparing the color film substrate according to the embodiments of the present disclosure, a test color film substrate may be prepared firstly, and then a compensation parameter of the supporting post height PSHO (for example, a height value that needs to be adjusted downward in order to achieve the uniformity of the supporting post height PSH) in at least one subregion AA (for example, each subregion AA) of the test color film substrate may be determined. When preparing the target color film substrate, the greater the compensation parameter of the supporting post height PSHO in the subregion AA, the greater the partition slot width SLW in the subregion AA. In this way, even if the uniformity of the supporting post height PSH in different subregions AA may be insufficient due to the supporting post PS preparing equipment, by adjusting the partition slot SL in at least part of the subregions AA of the target color film substrate, the supporting post height PSH of the target color film substrate can have high uniformity.

In an embodiment of the present disclosure, among two subregions AA with different widths of the partition slots SL, the top-to-bottom segment difference of the supporting post PS in the subregion AA with a greater width of the partition slot SL is greater. In other words, when a factor of equipment uniformity causes the top-to-bottom segment difference of the supporting post PS in a subregion AA to be greater, the supporting post height PSH in the subregion AA is often higher without setting the partition slot SL. In the embodiments of the present disclosure, by increasing the partition slot SL in the subregion AA, the sinking degree of the supporting post PS in the subregion AA can be increased, and then the supporting post height PSH in the subregion AA can be compensated to a greater extent (reducing the supporting post height PSH to a greater extent), thus making the height uniformity of the supporting post PS on the color film substrate better.

In the embodiments of the present disclosure, along the column direction DV, the size between two adjacent light-transmitting windows HH is the sub-pixel pitch HHW; a ratio of the width SLW of the partition slot SL to the sub-pixel pitch HHW can be defined as a partition slot duty ratio SLD. The partition slot duty ratio SLD is positively correlated with the partition slot width SLW; the greater the partition slot duty ratio SLD, the greater the partition slot width SLW; conversely, the smaller the partition slot duty ratio SLD, the smaller the partition slot width SLW.

In an embodiment of the present disclosure, the partition slot duty ratio SLD is no more than 90%. In this way, light leakage or color deviation caused by too few color-resist units CF between the light-transmitting windows HH can be avoided.

In an embodiment of the present disclosure, the partition slot duty ratio SLD may be greater than 10%. Furthermore, when the thickness of the protective layer OCL is no more than 1.2 microns, the partition slot duty ratio SLD may be greater than 10%; when the thickness of the protective layer OCL is greater than 1.2 microns, the partition slot duty ratio SLD may be greater than 15%. Referring to FIG. 3, in this way, the partition slot width SLW can be wide enough to increase the value of T of the supporting post PS/B of the blue light-transmitting window (top end size Lt/big end size Lb), thereby improving the aperture ratio of the color film substrate. Specifically, the smaller the size of the big end of the supporting post PS, the smaller the size of the black matrix required to cover and support the supporting post PS, more conducive to increasing the size of the light-transmitting window HH so as to increase the aperture ratio of the color film substrate.

Referring to FIG. 3, the surface of the protective layer OCL away from the base substrate BP is provided with a recessed region overlapping with the partition slot SL; the orthographic projection of the bottom edge of the supporting post PS on the protective layer OCL is at least partially located in the recessed region. Due to the setting of the recessed region, the big ends of at least part of the supporting posts PS will not be completely consistent with the bottom end surfaces of the supporting posts PS; along the direction away from the base substrate BP, the cross-sectional sizes of at least part of the supporting posts PS (the cross section being parallel to the base substrate BP) firstly increase in sequence, and then gradually decrease. Therefore, the size of the top end surface and the size of the bottom end surface may not be the maximum size of the orthographic projection of the supporting post PS on the base substrate BP. Referring to the example in FIG. 3, for at least part of the supporting posts PS, the size of the structure surrounded by the edge of the contacting surface between the supporting post PS and the protective layer OCL is the big end size of the supporting post PS. Thus, in the embodiments of the present disclosure, the top end size is the size of the top end surface of the supporting post PS (the surface away from the base substrate BP); the big end size is the maximum size of the orthographic projection of the overall structure of the supporting post PS on the base substrate BP.

Referring to FIG. 3, during the developing process of the supporting post PS, the developer will gather in the recessed region, which will cause the part of the supporting post PS located in the recessed region to be overdeveloped, thereby reducing the size of the part of the supporting post PS located in the recessed region, and reducing the big end size of the supporting post PS. In some verifications, it was found that when the thickness of the protective layer OCL is 1.2 microns and the partition slot duty ratio SLD is 10%, the T/blue light-transmitting window B value of the supporting post PS is about 57%; and when the partition slot duty ratio SLD is increased to 15%, the value of T of the supporting post PS/B of the blue light-transmitting window can be increased to 65%. In other verifications, it was found that when the thickness of the protective layer OCL is 1.5 microns or 1.8 microns, if the partition slot duty ratio SLD is 15%, the value of T of the supporting post PS/B of the blue light-transmitting window is about 57%; and when the partition slot duty ratio SLD is increased to 20%, the value of T of the supporting post PS/B of the blue light-transmitting window can be increased to 65%.

In an embodiment of the present disclosure, each subregion AA of the color film substrate is provided with a partition slot SL. In this way, on one hand, for each subregion AA, the supporting post height PSH can be can adjusted by means of the partition slot SL; and on the other hand, the value of T of the supporting post PS/B of the blue light-transmitting window can be increased by means of the partition slot SL. In an example, the partition slot duty ratio SLD in each subregion AA is greater than 15%; for example, the partition slot duty ratio SLD in each subregion AA is greater than 15% and less than 90%.

In another embodiment of the present disclosure, only part of the subregions AA in the color film substrate are provided with partition slots SL. In this way, the difficulty of pattern design and preparation of the color-resist layer CFL can be reduced, and the cost of the color film substrate can be reduced. In a verification example, when each subregion AA of the color film substrate is not provided with the partition slot SL, the fluctuation range of the supporting post height PSH on the color film substrate reaches 0.17 microns (referring to FIG. 12); and when part of the subregions AA are provided with partition slots SL to compensate the supporting post height PSH, the fluctuation range of the supporting post height PSH of the color film substrate is reduced to 0.12 micrometers (referring to FIG. 13), which greatly improves the uniformity of the supporting post height PSH.

In an embodiment of the present disclosure, in a subregion AA provided with the partition slot SL, the number of supporting post PS in the subregion AA is more than one. In this way, each subregion AA can be provided with a relatively larger area, which facilitates pattern design and preparation of the color-resist layer CFL, and is especially beneficial to reducing the complexity of the mask required for the preparation of the color-resist layer CFL and reducing the preparing cost of the color film substrate. In an example, each subregion AA can be provided with 10-50 supporting posts PS.

In an embodiment of the present disclosure, in a subregion AA provided with the partition slot SL, the number of the supporting post PS in the subregion AA is one. In other words, the color film substrate may include subregions AA in one to one correspondence with each supporting post PS, and each subregion AA is only provided with one supporting post PS. In this way, the height of each supporting post PS can be compensated in a targeted manner, and then the uniformity of the height of the supporting post PS can be improved at the sub-pixel level instead of the region level, which can improve the accuracy of the control of the height of the supporting post PS, and better improve the uniformity of the supporting post height PSH.

In the embodiments of the present disclosure, in the subregion AA provided with the partition slot SL, the partition slot SL needs to be provided at the position where the supporting post PS is provided. At the position where the supporting post PS is not provided, the partition slot SL may be provided, or the partition slot SL may not be provided.

In an example, referring to FIG. 5, in at least one subregion AA, the color-resist layer CFL may include color-resist units CF in one to one correspondence with each light-transmitting window HH, and each color-resist unit CF may cover the corresponding light-transmitting window HH with its edge overlapping on the black matrix layer BML. In this way, partition slots SL are provided between two adjacent color-resist units CF along the column direction DV. Furthermore, the width SLW of each partition slot is the same, that is, each partition slot duty ratio SLD is the same. This can simplify the pattern design of the color-resist layer CFL in the subregion AA, thereby reducing the complexity of the mask, reducing the difficulty of preparing the color film substrate, and reducing the preparing cost of the color film substrate. In addition, this setting manner also leaves room for adjusting the position and number of the supporting post PS.

Figure 6:
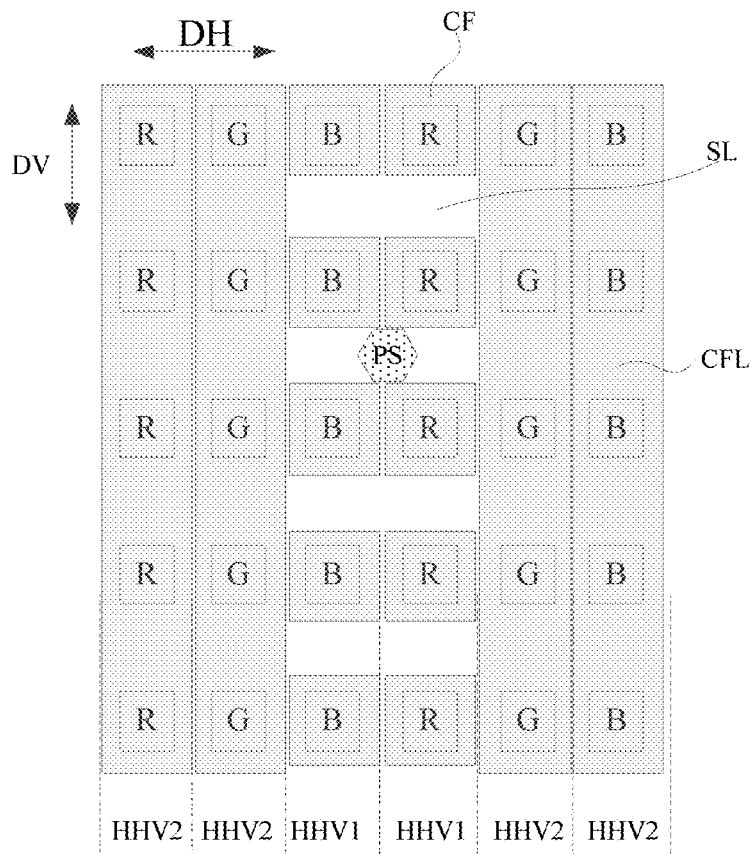
FIG. 6 is a schematic structural diagram of a color-resist layer and a supporting post in a subregion according to some embodiments of the present disclosure.

In another example, referring to FIG. 6, in at least one subregion AA, the arrangement region of part of the light-transmitting window columns is provided with the supporting post PS, and these light-transmitting window columns can be defined as first light-transmitting window columns HHV1; the arrangement region of part of the light-transmitting window columns is provided with no supporting post PS, and these light-transmitting window columns can be defined as second light-transmitting window columns HHV2. Among them, in the arrangement region of the first light-transmitting window columns HHV1, the color-resist layer CFL can be provided with color-resist units CF in one to one correspondence with each light-transmitting window HH, and each color-resist unit CF can cover the corresponding light-transmitting window HH with its edge overlapping on the black matrix layer BML; thus, in the arrangement region of the first light-transmitting window columns HHV1, a partition slot SL is provided between two adjacent color-resist units CF along the column direction DV. In the arrangement region of the second light-transmitting window columns HHV2, the color-resist layer CFL is not provided with the partition slot SL.

Figure 7:
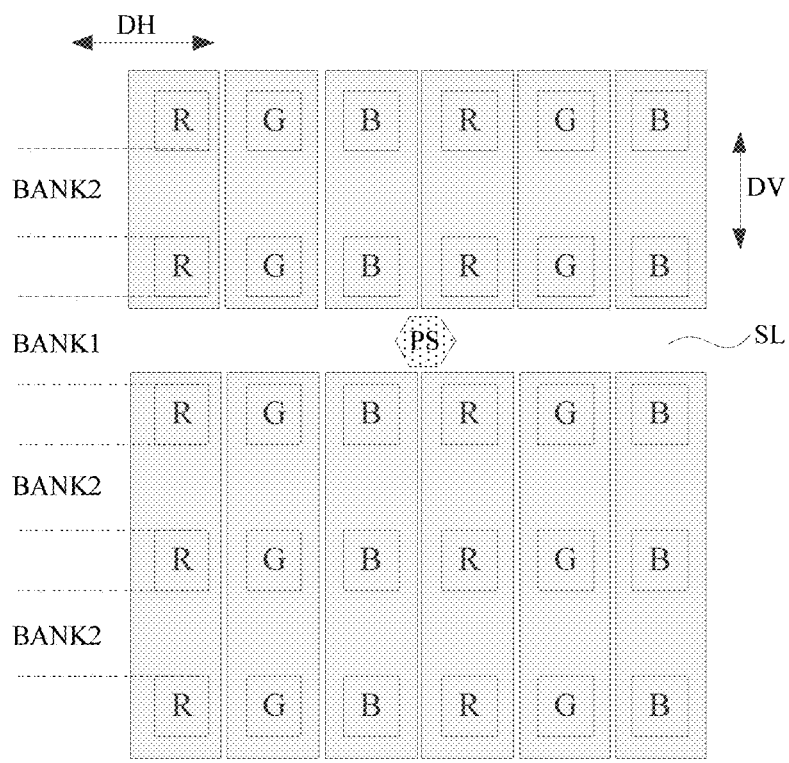
FIG. 7 is a schematic structural diagram of a color-resist layer and a supporting post in a subregion according to some embodiments of the present disclosure.

In another example, referring to FIG. 7, in at least one subregion AA, the color film substrate includes light-transmitting window HH rows arranged at intervals in sequence along the column direction DV and an inter-row space, and the supporting post PS is located in the inter-row space. Among them, the inter-row space provided with the supporting post PS is defined as a first inter-row space BANK1; the inter-row space provided with no supporting post PS is defined as a second inter-row space BANK2. In the second inter-row space BANK2, the color-resist layer CFL is provided with no partition slot SL. In the first inter-row space BANK1, the color-resist layer CFL is provided with the partition slot SL, so that the color-resist layer CFL is completely partitioned in the first inter-row space BANK1.

Figure 8:
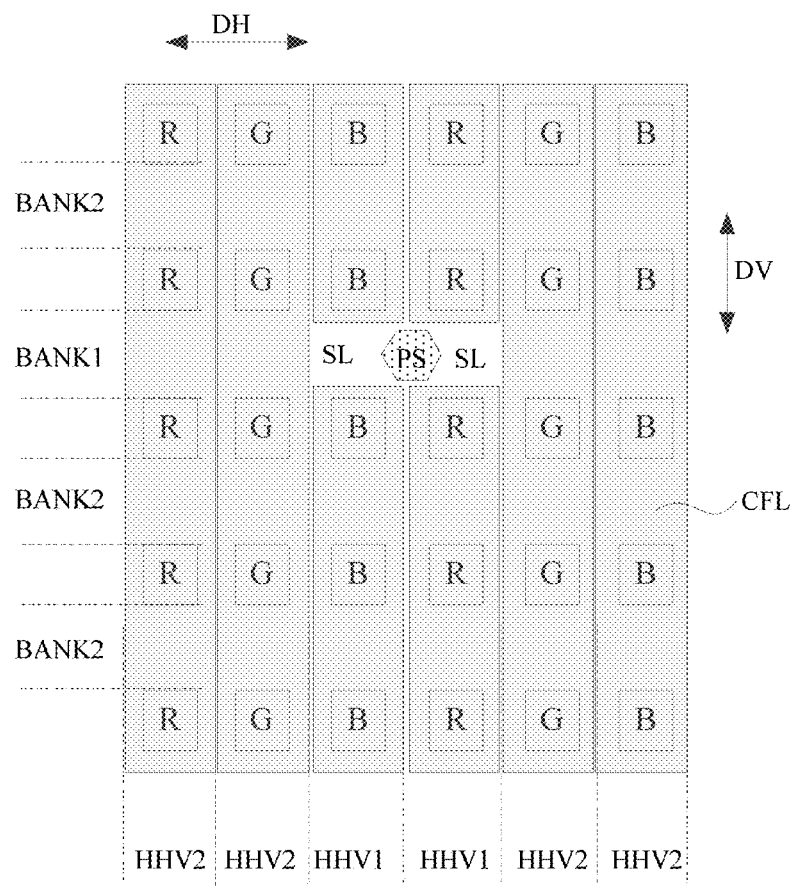
FIG. 8 is a schematic structural diagram of a color-resist layer and a supporting post in a subregion according to some embodiments of the present disclosure.

In another example, referring to FIG. 8, in at least one subregion AA, part of the light-transmitting window columns is the first light-transmitting window column HHV1, and part of the light-transmitting window columns is the second light-transmitting window column HHV2; part of the inter-row spaces is the first inter-row space BANK1, and part of the inter-row spaces is the second inter-row space BANK2. In this example, the overlapping region of the color-resist layer CFL in the arrangement region of the first inter-row space BANK1 and the first light-transmitting window column HHV1 is provided with partition slots SL, and the remaining region is provided with no partition slot SL.

It can be understood that FIG. 5 to FIG. 8 are only some practicable examples of providing the partition slot SL in the subregion AA in the embodiments of the present disclosure. In other examples of the present disclosure, the partition slot SL in the subregion AA may be provided in other ways as needed.

Figures 9, 10:
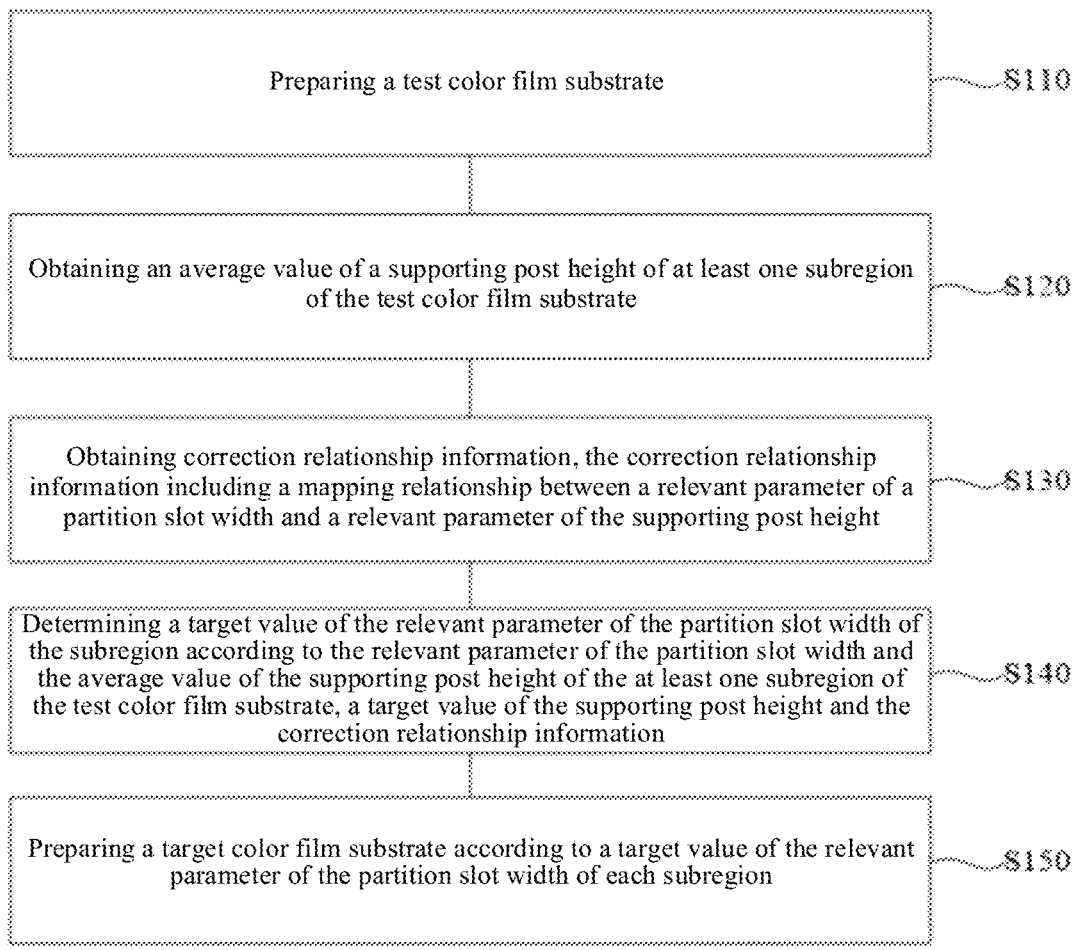
FIG. 9 is a schematic flowchart of a method for preparing a color film substrate according to some embodiments of the present disclosure.
FIG. 10 is a schematic diagram of subregions of a mapping color film substrate according to some embodiments of the present disclosure.

In the embodiment of the present disclosure, referring to FIG. 9, the method for preparing the color film substrate includes:

In step S110, a test color film substrate is prepared;

In step S120, an average value of a supporting post height APSH of at least one subregion AA of the test color film substrate is obtained;

In step S130, correction relationship information is obtained; the correction relationship information includes a mapping relationship between a relevant parameter of the partition slot width and a relevant parameter of the supporting post height;

In step S140, according to the relevant parameter of the partition slot width and the average value of the supporting post height APSH of at least one subregion of the test color film substrate, a target value of the supporting post height GPSH, and the correction relationship information, a target value of the relevant parameter of the partition slot width of the subregion AA is determined;

In step S150, a target color film substrate is prepared according to the target value of the relevant parameter of the partition slot width of each subregion AA.

In the method for preparing the color film substrate provided in the embodiments of the present disclosure, before preparing the target color film substrate, the test color film substrate and the correction relationship information can be obtained firstly. Then, at least one subregion of the test color film substrate can be compensated by means of the correction relationship information. The specific compensation strategy is to determine the target value of the relevant parameter of the partition slot width of the subregion so that the supporting post height PSH of the subregion is close to the average value of the supporting post height APSH. Afterwards, the target color film substrate is prepared according to the determined target value of the relevant parameter of the partition slot width of the subregion. Since the supporting post height PSH of at least one subregion of the target color film substrate has been compensated by adjusting the target value of the relevant parameter of the partition slot width, the average value of the supporting post height APSH in this subregion can be made close to the target value of the supporting post height GPSH, thereby improving the uniformity of the supporting post height PSH in the color film substrate. The method for preparing the color film substrate of the present disclosure will be further explained and described in conjunction with specific examples as follows.

In an embodiment of the present disclosure, step S110 may include preparing the test color film substrate by using production line equipment. In the process of preparing the test color film substrate, equipment such as coating equipment and developing equipment is used to prepare the supporting post layer PSL of the color film substrate.

In an embodiment of the present disclosure, in step S110, a test color film motherboard may be obtained, and the test color film motherboard has one or more test color film substrates. By cutting the test color film motherboard, each test color film substrate can be obtained. It is also possible not to cut the test color film motherboard. In the embodiment, the color film substrates located at different positions of the test color film motherboard are different test color film substrates, although some of these color film substrates may be applied to a same liquid crystal display panel. Furthermore, when there is a plurality of color film substrates on the color film motherboard, it is needed to prepare a corresponding target color film substrate according to the test color film substrate; the position of the target color film substrate on the target color film motherboard is the same as the position of the test color film substrate on the test color film motherboard. In an embodiment of the present disclosure, in step S110, each subregion of the test color film substrate may be provided with no partition slot SL.

In another embodiment of the present disclosure, in step S110, each subregion of the test color film substrate may be provided with the partition slot SL, and the relevant parameter of the partition slot width of the partition slot SL in each subregion is the same, for example, the partition slot width SLW or the partition slot duty ratio SLD is the same. Furthermore, the partition slot duty ratio SLD is in the range of 0-15%. Exemplarily, each subregion of the test color film substrate is provided with the partition slot SL, and the partition slot duty ratio SLD is the same, being 10% or 15%. Certainly, in other embodiments, the partition slot duty ratio SLD in each subregion of the test color film substrate may also be greater than 15%, for example, being 20% or 30%.

In an embodiment of the present disclosure, in step S110, the test color film substrate is prepared according to the structure and preparation process of the target color film substrate; the difference between the target color film substrate and the test color film substrate in the preparation process and structure is only that the color-resist layers CFL of the two color film substrates are different. In this way, according to the result of the test color film substrate, the pattern of the color-resist layer CFL in at least one subregion of the color film substrate can be adjusted, and then the supporting post height PSH of the color film substrate in the subregion can be adjusted. The color film substrate prepared after adjusting the pattern of the color-resist layer CFL is the target color film substrate, and the uniformity of the supporting post height PSH of the target color film substrate has been optimized in a targeted manner, so it is better than the test color film substrate.

In step S120, the average value of the supporting post height APSH of at least one subregion AA of the test color film substrate may be obtained, for example, the respective average value of the supporting post height APSH of each subregion AA of the test color film substrate may be obtained. For example, each supporting post height PSH in each subregion of the test color film substrate can be measured, and then the average value of the supporting post height APSH in each subregion can be calculated. It can be understood that, when only one supporting post PS is included in the subregion, the average value of the supporting post height APSH in the subregion is the height of the supporting post PS.

Furthermore, the color scale diagram of the color film substrate can be prepared according to the average value of the supporting post height APSH of each subregion, and the color scale diagram is used to mark the subregions with separate color according to the level of the average value of the supporting post height APSH, so as to intuitively reflect which subregions need to compensate for the supporting post height PSH. For example, the subregions where the average value of the supporting post height APSH is close to the target value of the supporting post height GPSH can be marked as green or light color; the subregions where the average value of the supporting post height APSH greatly exceeds the target value of the supporting post height GPSH can be marked as red or dark color. FIG. 12 illustrates a color scale diagram of a test color film substrate, the test color film substrate has 144 subregions; the color scale diagram shows the average value of the supporting post height APSH of each subregion and the color marking of the subregion. According to the color marking, it can be seen intuitively how much the average value of the supporting post height APSH of each subregion deviates from the target value of the supporting post height GPSH.

In an embodiment of the present disclosure, the average value of the supporting post height of each subregion of the test color film motherboard can be obtained, and then the color scale diagram of the test color film motherboard can be prepared. Among them, the subregions of the test color film substrate are only part of the subregions of the test color film motherboard.

In step S130, correction relationship information may be obtained. The correction relationship information includes the mapping relationship between the relevant parameter of the partition slot width and the relevant parameter of the supporting post height. The correction relationship information may be a table, a fitted curve, a piecewise function, discrete data points, or in other forms, as long as the mapping relationship between the relevant parameter of the partition slot width and the relevant parameter of the supporting post height can be reflected.

In an example, the relevant parameter of the partition slot width is the partition slot width SLW or the partition slot duty ratio SLD. The relevant parameter of the partition slot width may also be other parameters that can directly or indirectly reflect the partition slot width SLW.

In an example, the relevant parameter of the supporting post height is the supporting post height PSH or the supporting post height difference PSD; the supporting post height difference PSD is the difference between the supporting post height PSH and a set height. The relevant parameter of the supporting post height may also be other parameters that can directly or indirectly reflect the supporting post height PSH.

In an example, the correction relationship information includes a plurality of discrete correction samples SM, and any one of the correction samples SM includes the relevant parameter of the partition slot width and the relevant parameter of the supporting post height corresponding to each other. The correction relationship information can be expressed in the form of a table shown in Table 1. Certainly, the correction relationship information may also be expressed in other forms. In the example in Table 1, the relevant parameter of the partition slot width is the partition slot duty ratio SLD, and the relevant parameter of the supporting post height is the supporting post height PSH. It can be understood that Table 1 provides three pieces of different correction relationship information, and which the thicknesses of the protective layers OCL applicable to the three pieces of different correction relationship information are different.

TABLE 1

Correction relationship information

| Partition slot duty ratio (%) | Supporting post height PSH@OC = 1.8 microns | Supporting post height PSH@OC = 1.5 microns | Supporting post height PSH@OC = 1.2 microns |
|---|---|---|---|
| 0 | 3.07 | 3.06 | 3.04 |
| 5 | 3.03 | 3.03 | 3.01 |
| 10 | 3.00 | 3.00 | 2.99 |
| 15 | 2.97 | 2.95 | 2.94 |
| 20 | 2.95 | 2.93 | 2.93 |
| 25 | 2.90 | 2.90 | 2.88 |
| 30 | 2.87 | 2.87 | 2.85 |
| 35 | 2.85 | 2.85 | 2.83 |
| 40 | 2.82 | 2.82 | 2.80 |
| 45 | 2.77 | 2.76 | 2.75 |
| 50 | 2.75 | 2.75 | 2.73 |
| 55 | 2.71 | 2.70 | 2.69 |
| 60 | 2.69 | 2.69 | 2.67 |
| 65 | 2.67 | 2.68 | 2.65 |
| 70 | 2.64 | 2.64 | 2.62 |
| 75 | 2.61 | 2.62 | 2.60 |
| 80 | 2.58 | 2.58 | 2.56 |
| 85 | 2.56 | 2.55 | 2.55 |
| 90 | 2.52 | 2.52 | 2.50 |
| 95 | 2.49 | 2.47 | 2.46 |
| 100 | 2.44 | 2.44 | 2.42 |

In an embodiment of the present disclosure, a mapping color film substrate may be prepared to obtain the correction relationship information. For example, a mapping color film substrate can be prepared in advance according to the method of preparing the color film substrate; where, the mapping color film substrate includes a plurality of subregions provided in an array (for example, four subregions or 16 subregions), and each subregion includes a plurality of sub-subregions; the relevant parameter of the partition slot width (such as the partition slot duty ratio SLD) in each sub-subregion is different. In this way, the sub-subregions including the relevant parameters of the same partition slot width are evenly distributed on the mapping color film substrate. Through statistics of the average value of each supporting post height PS in each sub-subregion including the relevant parameter of the same partition slot width, a correction sample SM can be determined, and the correction sample SM includes the relevant parameter of the partition slot width and the corresponding average value of the supporting post height APSH. In this way, the correction relationship information can be determined through the statistics and analysis of the height of each supporting post PS on the mapping color film substrate.

In an embodiment of the present disclosure, the mapping color film substrate may be a whole color film motherboard; that is, the mapping color film substrate may not be in one to one correspondence with the test color film substrate, but may correspond to the color film motherboard for preparing the color film substrate.

In an example, referring to FIG. 10, the mapping color film substrate may include 16 subregions, blue light-transmitting window BB1 to blue light-transmitting window BB16. Referring to FIG. 11, any one of the subregions includes twenty sub-subregions, and the partition slot duty ratio SLD of the partition slot SL in each sub-subregion is different. For example, the partition slot duty ratios SLD of the twenty sub-subregions are 0%, 5%, 10%, . . . 95%, 100%, respectively.

In an example, the coating equipment and exposure equipment used in preparing the supporting post layer PSL of the test color film substrate are the same as the coating equipment and exposure equipment used in preparing the supporting post layer PSL of the target color film substrate. Furthermore, the coating equipment and exposure equipment used in preparing the supporting post layer PSL of the test color film substrate and the coating equipment and exposure equipment used in preparing the supporting post layer PSL of the mapping color film substrate, are the same as the coating equipment and exposure equipment used in preparing the supporting post layer PSL of the target color film substrate, so as to ensure that these color film substrates face the same uneven coating and exposure.

In some other embodiments, one or more of the existing correction relationship information may also be selected as the selected correction relationship information. For example, the correction relationship information of other products on the same production line is selected as the selected correction relationship information. When preparing the color film substrate, the selected correction relationship information is used to compensate the test color film substrate without additional preparation of the mapping color film substrate.

In some embodiments, the correction relationship information has an applicable range. When selecting the correction relationship information, it is necessary to select the correction relationship information with an appropriate application range.

In an example, the applicable range includes a thickness range of the protective layer OCL. Obtaining the correction relationship information includes obtaining the correction relationship information so that the thickness of the protective layer OCL of the color film substrate satisfies the applicable range of the correction relationship information. When the thickness of the protective layer OCL of the color film substrate does not satisfy the thickness range of the protective layer OCL of a correction relationship information, the correction relationship information may not be used. Exemplarily, when the thickness of the protective layer OCL of the color film substrate is 1.8 microns, the correction relationship information composed of data in the first column and the second column in Table 1 can be selected as the selected correction relationship information instead of the correction relationship information composed of data in the third column and the fourth column.

In an example, the applicable range includes a supporting post height PSH range under a set relevant parameter of the partition slot width. Obtaining the correction relationship information includes obtaining the correction relationship information so that the average value of the supporting post height APSH of the color film substrate satisfies the supporting post height PSH range in the application range. When the average value of the supporting post height APSH of the color film substrate does not satisfy the supporting post height PSH range of the correction relationship information, the correction relationship information is not used. For example, the applicable range of the supporting post height PSH of data in the second column of Table 1 (the partition slot duty ratio SLD=0) is 3.4 microns to 2.6 microns. When the average value of the supporting post height APSH of the color film substrate is 3.3 microns, the correction relationship information composed of data in the second column and data in the first column can be used as the selected correction relationship information. However, when the average value of the supporting post height APSH of the color film substrate is 2.4 microns, the correction relationship information composed of data in the second column and data in the first column is not used as the selected correction relationship information in the preparation process of the color film substrate.

In an embodiment of the present disclosure, step S140 may include the following.

In step S210, according to the average value of the supporting post height APSH in the subregion AA and the target value of the supporting post height GPSH in the subregion AA, a compensation parameter of the supporting post height PSHO in the subregion AA is determined.

In step S220, according to the relevant parameter of the partition slot width of the subregion AA and the correction relationship information, a relevant parameter of the supporting post height corresponding to the relevant parameter of the partition slot width of the subregion AA is determined, and the determined relevant parameter of the supporting post height is taken as a basic parameter of the supporting post height PSHB of the subregion AA.

In step S230, according to the basic parameter of the supporting post height PSHB of the subregion AA and the compensation parameter of the supporting post height PSHO of the subregion AA, a correction parameter of the supporting post height PSHF of the subregion AA is determined.

In step S240, according to the correction parameter of the supporting post height PSHF of the subregion AA and the correction relationship information, a relevant parameter of the partition slot width corresponding to the correction parameter of the supporting post height PSHF is determined, and the determined relevant parameter of the partition slot width is taken as a target value of the relevant parameter of the partition slot width of the subregion AA.

In some embodiments, the compensation parameter of the supporting post height PSHO of the subregion AA is a compensation height value (the height value to be reduced), which may be the difference between the average value of the supporting post height APSH and the target value of the supporting post height GPSH of the subregion AA of the test color film substrate.

In some embodiments, the relevant parameter of the partition slot width may be the partition slot duty ratio SLD.

In some embodiments, the relevant parameter of the supporting post height may be the supporting post height PSH; correspondingly, the basic parameter of the supporting post height PSHB is also a height value.

In some embodiments, the correction parameter of the supporting post height PSHF may be the supporting post height PSH. In an example, the correction parameter of the supporting post height PSHF is the difference between the basic parameter of the supporting post height PSHB and the compensation parameter of the supporting post height PSHO.

In an embodiment of the present disclosure, the correction relationship information includes a plurality of discrete correction samples SM, and any one of the correction samples SM includes a relevant parameter of the partition slot width and a corresponding relevant parameter of the supporting post height.

According to the relevant parameter of the partition slot width of the subregion AA and the correction relationship information, determining the relevant parameter of the supporting post height corresponding to the relevant parameter of the partition slot width of the subregion AA includes:

determining, according to the relevant parameter of the partition slot width of the subregion AA and each of the correction samples SM, the relevant parameter of the supporting post height corresponding to the relevant parameter of the partition slot width of the subregion AA by using a linear difference algorithm;

According to the correction parameter of the supporting post height PSHF of the subregion AA and the correction relationship information, determining the relevant parameter of the partition slot width corresponding to the correction parameter of the supporting post height PSHF includes:

determining, according to the correction parameter of the supporting post height PSHF of the subregion AA and each of the correction samples SM, the relevant parameter of the partition slot width corresponding to the correction parameter of the supporting post height PSHF by using a linear difference algorithm.

As follows, the above step S210 to step S240 will be exemplarily described by taking that the target value of the relevant parameter of the width of the partition slot of the subregion in the top left corner of the color film substrate is determined as an example.

In step S210, referring to FIG. 12, according to the average value of the supporting post height APSH of subregion AA in the top left corner and the target value of the supporting post height GPSH of the subregion AA, the compensation parameter of the supporting post height PSHO of the subregion AA is determined. Specifically, the average value of the supporting post height APSH of the subregion AA in the top left corner is 3.14 microns; the target value of the supporting post height GPSH of the color film substrate is 3.05 microns. In this way, it can be determined that the compensation parameter of the supporting post height PSHO of the subregion AA in the top left corner is: 3.14 microns–3.05 microns=0.09 microns. This shows that, for the subregion AA in the top left corner of the test color film substrate, it is needed to reduce the supporting post height PSH by 0.09 microns, so as to reach the target value of the supporting post height GPSH.

In step S220, it may be determined that the partition slot duty ratio SLD of the subregion AA in the top left corner of the test color film substrate is 0. According to the correction relationship information composed of data in the first column and data in the second column in Table 1, the supporting post height PSH when the partition slot duty ratio SLD is 0 is determined as the basic parameter of the supporting post height PSHB of the subregion AA, and the basic parameter of the supporting post height PSHB is 3.07 microns.

In step S230, according to the basic parameter of the supporting post height PSHB (3.07 microns) of the subregion AA in the top left corner and the compensation parameter of the supporting post height PSHO (0.09 microns) of the subregion AA in the top left corner, the correction parameter of the supporting post height PSHF of the subregion AA in the top left corner is determined, which is 3.07 microns–0.09 microns=2.98 microns.

In step S240, according to the correction parameter of the supporting post height PSHF (2.98 microns) of the subregion AA in the top left corner and the correction relationship information composed of data in the first column and data in the second column in Table 1, the relevant parameter of the partition slot width (the partition slot duty ratio SLD) corresponding to the correction parameter of the supporting post height PSHF (2.98 microns) is determined, and the determined relevant parameter of the partition slot width is taken as the target value of the relevant parameter of the partition slot width of the subregion AA. In this example, when the correction parameter of the supporting post height PSHF is 2.97 microns, the corresponding partition slot duty ratio SLD is 15%; and, when the correction parameter of the supporting post height PSHF is 3.00 microns, the corresponding partition slot duty ratio SLD is 10%. Therefore, it can be determined that the partition slot duty ratio SLD is 11.6% when the correction parameter of the supporting post height PSHF is 2.98 microns, by combining a linear difference algorithm.

In this way, according to the above method, the target value of the relevant parameter of the partition slot width in each subregion AA can be determined in sequence.

Figure 13:
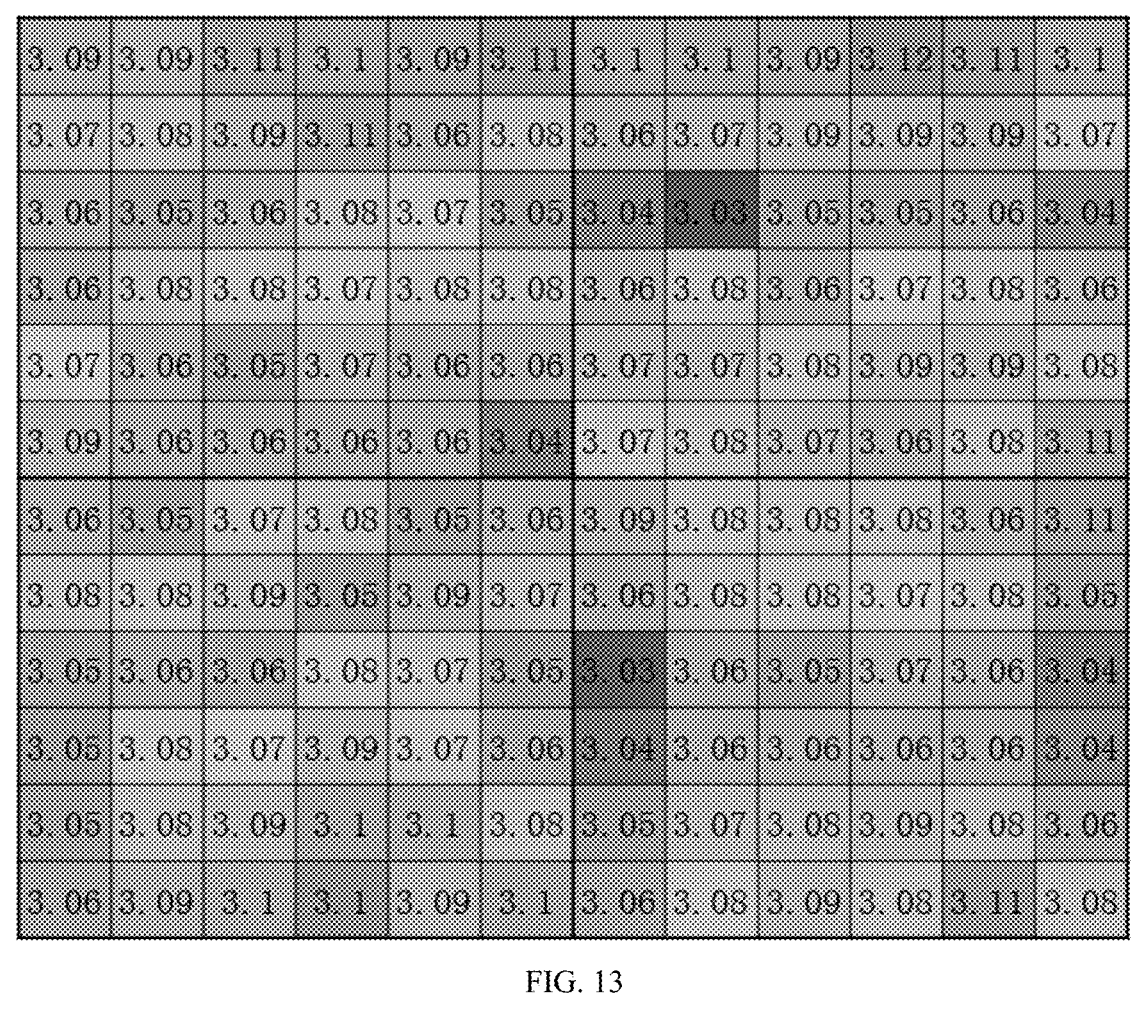

In step S150, the target color film substrate can be prepared according to the target value of the relevant parameter of the partition slot width of each subregion AA determined in step S140. In the target color film substrate, the partition slot duty ratio SLD of the subregion AA in the top left corner is 11.6%. Referring to FIG. 13, at this time, the average value of the supporting post height APSH is 3.09 microns, which is reduced by 0.05 microns compared to the test color film substrate, significantly improving the uniformity of the supporting post height PSH of the target color film substrate.

It should be noted that although the steps of the method for preparing the color film substrate in the present disclosure are described in a specific order in the accompanying drawings, this does not require or imply that these steps must be performed in this specific order, or that all the steps shown must be performed to achieve the desired result. Additionally or alternatively, certain steps may be omitted, a plurality of steps may be combined into one step for execution, and/or one step may be decomposed into a plurality of steps for execution, etc.

Other embodiments of the present disclosure will be readily apparent to those skilled in the art from consideration of the description and practice of the present disclosure. The present disclosure is intended to cover any modification, use or adaptation of the present disclosure, which follow the general principles of the present disclosure and include common knowledge or conventional technical means in the technical field not disclosed in the present disclosure. The description and embodiments are to be considered as examples only, with the true scope and spirit of the present disclosure indicated by the appended claims.

What is claimed is:

1. A color film substrate, comprising a base substrate, a black matrix layer, a color-resist layer, a protective layer, and a supporting post layer that are stacked and provided in sequence; wherein, the black matrix layer is provided with light-transmitting windows distributed in an array, the color-resist layer covers each light-transmitting window, and the supporting post layer is provided with a supporting post;
the color film substrate comprises a plurality of different subregions;
in at least part of the subregions, the color-resist layer is provided with a partition slot located between rows of the light-transmitting windows and exposing the black matrix layer, and an orthographic projection of the supporting post on the base substrate at least partially overlaps with an orthographic projection of the partition slot on the base substrate;
wherein, in at least two of the subregions, the partition slot is provided with different widths, and a width of the partition slot is a size of the partition slot in a column direction.

2. The color film substrate according to claim 1, wherein, along the column direction, a size between two adjacent light-transmitting windows is a sub-pixel pitch; and, a ratio of the width of the partition slot to the sub-pixel pitch is no more than 90%.

3. The color film substrate according to claim 1, wherein, along the column direction, a size between two adjacent light-transmitting windows is a sub-pixel pitch;
and, a ratio of the width of the partition slot to the sub-pixel pitch is greater than 10%.

4. The color film substrate according to claim 1, wherein a difference between an average value of a height of each supporting post in any one of the subregions and an average value of a height of each supporting post in another one of the subregions is no more than 0.12 microns; and
the height of the supporting post refers to a segment difference between a top end surface of the supporting post and a surface of the protective layer away from the base substrate.

5. The color film substrate according to claim 1, wherein, in at least part of the subregions, a surface of the protective layer away from the base substrate is provided with a recessed region overlapping with the partition slot, and an orthographic projection of the supporting post on the protective layer is located in the recessed region.

6. The color film substrate according to claim 1, wherein, in any one of the subregions, a number of the supporting post is one or more.

7. The color film substrate according to claim 1, wherein, in two subregions where widths of the partition slot are different, a top-to-bottom segment difference of the supporting post is larger in a subregion where the width of the partition slot is larger; and
the top-to-bottom segment difference of the supporting post refers to a segment difference between a top end surface of the supporting post and a bottom end surface of the supporting post.

8. A liquid crystal display panel, comprising a color film substrate, and a driving substrate provided in a box opposite to the color film substrate;
wherein the color film substrate comprises a base substrate, a black matrix layer, a color-resist layer, a protective layer, and a supporting post layer that are stacked and provided in sequence; wherein, the black matrix layer is provided with light-transmitting windows distributed in an array, the color-resist layer covers each light-transmitting window, and the supporting post layer is provided with a supporting post;
the color film substrate comprises a plurality of different subregions;
in at least part of the subregions, the color-resist layer is provided with a partition slot located between rows of the light-transmitting windows and exposing the black matrix layer, and an orthographic projection of the supporting post on the base substrate at least partially overlaps with an orthographic projection of the partition slot on the base substrate;
wherein, in at least two of the subregions, the partition slot is provided with different widths, and a width of the partition slot is a size of the partition slot in a column direction.

9. A method for preparing a color film substrate, the color film substrate comprising a base substrate, a black matrix layer, a color-resist layer, a protective layer, and a supporting post layer that are stacked and provided in sequence; wherein, the black matrix layer is provided with light-transmitting windows distributed in an array, the color-resist layer covers each light-transmitting window, and the supporting post layer is provided with a supporting post;

the color film substrate comprises a plurality of different subregions; in at least part of the subregions, the color-resist layer is provided with a partition slot located between rows of the light-transmitting windows and exposing the black matrix layer, and an orthographic projection of the supporting post on the base substrate at least partially overlaps with an orthographic projection of the partition slot on the base substrate;

the method for preparing the color film substrate comprises:

preparing a test color film substrate;

obtaining an average value of a supporting post height of at least one subregion of the test color film substrate;

obtaining correction relationship information, the correction relationship information comprising a mapping relationship between a relevant parameter of a partition slot width and a relevant parameter of the supporting post height;

determining a target value of the relevant parameter of the partition slot width of the subregion according to the relevant parameter of the partition slot width and the average value of the supporting post height of the at least one subregion of the test color film substrate, a target value of the supporting post height and the correction relationship information; and preparing a target color film substrate according to a target value of the relevant parameter of the partition slot width of each subregion.

10. The method for preparing the color film substrate according to claim 9, wherein, determining a target value of the relevant parameter of the partition slot width of the subregion according to the relevant parameter of the partition slot width of the at least one subregion of the test color film substrate, the average value of the supporting post height, a target value of the supporting post height, and the correction relationship information comprises:

determining, according to an average value of the supporting post height of a subregion of the test color film substrate and a target value of the supporting post height of the subregion, a compensation parameter of the supporting post height of the subregion;

determining, according to a relevant parameter of the partition slot width of the subregion of the test color film substrate and the correction relationship information, a relevant parameter of the supporting post height corresponding to the relevant parameter of the partition slot width of the subregion, and taking the determined relevant parameter of the supporting post height as a basic parameter of the supporting post height of the subregion;

determining, according to the basic parameter of the supporting post height of the subregion and the compensation parameter of the supporting post height of the subregion, a correction parameter of the supporting post height of the subregion; and determining, according to the correction parameter of the supporting post height of the subregion and the correction relationship information, a relevant parameter of the partition slot width corresponding to the correction parameter of the supporting post height, and taking the determined relevant parameter of the partition slot width as the target value of the relevant parameter of the partition slot width of the subregion.

11. The method for preparing the color film substrate according to claim 10, wherein the correction relationship information includes a plurality of discrete correction samples, and any one of the correction samples comprises the relevant parameter of the partition slot width and the relevant parameter of the supporting post height corresponding to each other;

determining, according to the relevant parameter of the partition slot width of the subregion of the test color film substrate and the correction relationship information, a relevant parameter of the supporting post height corresponding to the relevant parameter of the partition slot width of the subregion comprises:

determining, according to the relevant parameter of the partition slot width of the subregion of the test color film substrate and each of the correction samples, the relevant parameter of the supporting post height corresponding to the relevant parameter of the partition slot width of the subregion by using a linear difference algorithm;

determining, according to the correction parameter of the supporting post height of the subregion and the correction relationship information, a relevant parameter of the partition slot width corresponding to the correction parameter of the supporting post height comprises:

determining, according to the correction parameter of the supporting post height of the subregion and each of the correction samples, the relevant parameter of the partition slot width corresponding to the correction parameter of the supporting post height by using a linear difference algorithm.

12. The method for preparing the color film substrate according to claim 9, wherein, the relevant parameter of the partition slot width is a partition slot width or a partition slot duty ratio; the partition slot width is a size of the partition slot in a column direction; the partition slot duty ratio is a ratio of the partition slot width to a sub-pixel pitch; and, the sub-pixel pitch is a size between two adjacent light-transmitting windows along the column direction; and the relevant parameter of the supporting post height is a supporting post height or a supporting post height difference; the supporting post height is a segment difference between a top end of the supporting post and a surface of the protective layer away from the base substrate; and, the supporting post height difference is a difference between the supporting post height and a set height.

13. The method for preparing the color film substrate according to claim 12, wherein, in the test color film substrate, the partition slot duty ratio is in a range of 0-15%.

14. The method for preparing the color film substrate according to claim 9, wherein, in each of the subregions of the test color film substrate, the partition slot width is same; and, the partition slot width is a size of the partition slot in a column direction.

15. The method for preparing the color film substrate according to claim 9, wherein the correction relationship information further comprises an applicable range, and the applicable range comprises a thickness range of the protective layer; and obtaining correction relationship information comprises:
obtaining the correction relationship information so that a thickness of the protective layer of the color film substrate satisfies the applicable range of the correction relationship information.

16. The method for preparing the color film substrate according to claim 9, wherein the correction relationship information further includes an applicable range, and the applicable range comprises a supporting post height range under a set relevant parameter of the partition slot width;
   obtaining correction relationship information comprises:
      obtaining the correction relationship information so that the average value of the supporting post height of the color film substrate satisfies the supporting post height range in the applicable range.

17. The method for preparing the color film substrate according to claim 9, wherein coating equipment and exposure equipment used in preparing the supporting post layer of the test color film substrate are same as coating equipment and exposure equipment used in preparing the supporting post layer of the target color film substrate.

18. The method for preparing the color film substrate according to claim 9, further comprising:
   preparing a color scale diagram of the test color film substrate according to the average value of the supporting post height of the at least one subregion.

19. The method for preparing the color film substrate according to claim 9, further comprising:
   preparing a color scale diagram of a test color film motherboard by obtaining the average value of the supporting post height of at least one subregion of the test color film motherboard.

20. The method for preparing the color film substrate according to claim 19, wherein subregions of the test color film substrate are part of subregions of the test color film motherboard.

* * * * *